US 6,692,867 B2

(12) United States Patent
Nark et al.

(10) Patent No.: US 6,692,867 B2
(45) Date of Patent: Feb. 17, 2004

(54) BATTERY SEPARATOR-PIN REMOVAL

(75) Inventors: Robert A. Nark, Charlotte, NC (US);
Ronald W. Call, Rock Hill, SC (US);
Donald K. Simmons, Charlotte, NC (US);
Mark W. Ferebee, Charlotte, NC (US)

(73) Assignee: Celgard Inc., Charlotte, NC (US)

( * ) Notice: Subject to any disclaimer, the term of this patent is extended or adjusted under 35 U.S.C. 154(b) by 129 days.

(21) Appl. No.: 09/976,982

(22) Filed: Oct. 12, 2001

(65) Prior Publication Data

US 2003/0072995 A1 Apr. 17, 2003

(51) Int. Cl.⁷ .................................................. H01M 2/16
(52) U.S. Cl. ...................... 429/142; 429/144; 429/254
(58) Field of Search ................................ 429/129, 142, 429/144, 247, 249, 250, 254; 508/459

(56) References Cited

U.S. PATENT DOCUMENTS

| 4,384,032 A | * | 5/1983 | Tashiro et al. ............... 429/249 |
| 5,281,491 A | * | 1/1994 | Rein et al. ............... 429/145 X |
| 5,885,947 A | * | 3/1999 | Maples ................... 508/459 X |
| 6,245,456 B1 | * | 6/2001 | Fukuda et al. .......... 429/131 X |

FOREIGN PATENT DOCUMENTS

| EP | 219190 | * | 4/1987 | ............ H01M/2/16 |
| JP | 10-110052 | | 4/1998 | |
| JP | 10-139918 | | 5/1998 | |
| JP | 10-195215 | | 7/1998 | |
| JP | 10-279717 | * | 10/1998 | ............ H01M/2/16 |

OTHER PUBLICATIONS

U.S. patent application Ser. No. 09/661,519, Ferebee, filed Sep. 13, 2000.
Witco Corporation, Additives Product Guide, Polymer Additives Group, Olefins/Styrenics, p. 1–17 (Date unknown).

* cited by examiner

Primary Examiner—Stephen Kalafut
(74) Attorney, Agent, or Firm—Robert H. Hammer, III

(57) ABSTRACT

A method for removing a pin from a battery assembly by the step of providing a separator comprising: a microporous membrane having an exterior surface portion of polypropylene, the polypropylene including at least 50 ppm of metallic stearate, preferably calcium stearate Static and being adapted to exhibit a pin removal force ≦7100 g.

20 Claims, No Drawings

BATTERY SEPARATOR-PIN REMOVAL

FIELD OF THE INVENTION

The instant invention is directed to a battery separator having improved pin removal properties.

BACKGROUND OF THE INVENTION

In the manufacture of high energy, lightweight batteries, for example, secondary lithium batteries, the battery assembly, i.e., an anode tape and a cathode tape sandwiching a separator tape, is wound about one (1) or more pins (or cores or mandrels). To begin winding of the assembly, the separator tape is taken up on the pin, and then the anode and cathode tapes are fed to the pin. Upon completion of the winding, the battery assembly is removed (or withdrawn) from the pin. If the assembly (i.e., the separator tape) sticks on the pin during withdrawal, the assembly "telescopes" and must be rejected. Such rejects increase the cost of the battery manufacturing process. Accordingly, battery manufacturers desire separator tapes that have improved pin removal properties, i.e., separators that will not stick to the pin when the battery assembly is removed therefrom.

Several attempts have been made to solve the foregoing pin removal problem. In Japanese Kokai 10-110052 published Apr. 28, 1998, the surface of a microporous membrane is textured to improve the pin removal. Spherical particles, consisting of an organic resin, preferably at least one resin selected from fluororesins and silicone resins, protrude from the membranes surface. The textured surface reduces frictional resistance. In Japanese Kokai 10-139918 published May 26, 1998, the surface of a microporous membrane is coated with a lubricant to improve pin removal. The coating may be accomplished by dip coating or roll coating. The lubricants include (waxes e.g., paraffin wax, microcrystalline wax, low-molecular weight polyethylene and other hydrocarbons waxes); fatty acid esters (e.g., methyl stearate, stearyl stearate, monoglyceride stearate); aliphatic amides (e.g., stearamide, palmitamide, methylene bis stearamide), and combinations thereof. In Japanese Kokai 10-195215 published Jul. 28, 1998, the surface portion of the microporous membrane, which has a greater ratio of polyethylene to polypropylene than the middle portion of the membrane, has improved pin removal properties. In U.S. patent application Ser. No. 09/661,519 filed Sep. 13, 2000, the surface of the pin is modified to improve pin removal. The surface modifications include texturing (roughing) the surface and/or grooving the surface of the pin.

The use of calcium stearate as an additive in polyolefin resins is known. See: *Plastics Engineering Handbook*, Chapman & Hall, New York City, N.Y., (1991), p. 645. Therein, it is noted that calcium stearate, when used in polyolefins, acts to 'tie up catalyst,' that lubricants are used to enhance resin processibility, and that 'effective lubricants . . . do not adversely affect the properties of end products' (i.e., they are inert). For example, 600 ppm of calcium stearate has been added to polypropylene for the purpose of acting as an acid scavenger. See Witco's Additive Product Guide, Polymer Additives Group, Olefins/Styrenics, page 2. Calcium stearate may also act as a lubricant to improve the flow characteristics of the polyolefin resins. Witco, Ibid., page 2. Polypropylene resins containing calcium stearate have been used to make battery separators, i.e., CELGARD® 2400, a single layer polypropylene separator, and CELGARD® 2300, a multilayered separator.

In spite of the foregoing efforts, there is still a need to improve the pin removal properties of these separators.

SUMMARY OF THE INVENTION

A method for removing a pin from a battery assembly comprising the step of providing a separator comprising:

a microporous membrane having an exterior surface portion of polypropylene, the polypropylene including at least 50 ppm of metallic stearate and being adapted to exhibit a pin removal force $\leq 7100$ g.

DESCRIPTION OF THE INVENTION

A microporous membrane, as used herein, has a plurality of micropores that extend through the membrane. The micropores have an average pore size ranging from 0.005 to 10 microns, preferably 0.01 to 5 microns, and most preferably 0.05 to 2 microns. The microporous membrane also has a Gurley (ASTM D726B) ranging from 5 to 100 seconds, preferably 10–60 seconds. Preferably, these membranes are "shutdown membranes," i.e., having the ability to stop ion flow between the anode and cathode upon the onset of a rapid increase in the battery's temperature due to, for example, internal short circuiting. The microporous membrane may be a single ply membrane or a multilayered membrane, as is well understood in the art. The preferred multilayered structure has a polypropylene/polyethylene/polypropylene structure (PP/PE/PP). The preferred single ply membrane is made from polypropylene. The exterior surface portion of the membrane (a coined term that refers to the surface of either a single ply or multi ply membrane) is preferably a polypropylene. The polypropylene is preferably an isotactic polypropylene homopolymer. Such polypropylene has a melt flow index (MFI) ranging from 1 to 4, preferably, 1.2 to 1.7. Such polypropylene has a density ranging from 0.90 to 0.91 g/cm$^3$. Preferably, these membrane's are produced by an 'extrude, anneal, stretch' method (a/k/a the 'dry stretch' or the Celgard® method), but may include other techniques such as 'solvent extraction.' See: Kesting, R., *Synthetic Polymeric Membranes*, John Wiley and Sons, New York City, N.Y. (1985), incorporated herein by reference.

It has been determined that the pin removal properties of the separator are improved by the inclusion of a metallic stearate in the polypropylene exterior surface portion of the membrane, preferably at least 50 ppm of the metallic stearate. The preferred metallic stearate is calcium stearate. Preferably, the calcium stearate in the polypropylene is at least 50 ppm, preferably 50–3000 ppm, and most preferred, between 300 and 600 ppm. The amount of calcium stearate was determined by induced coupled plasma (ICP) analysis. The lower limit defines the minimum amount of metallic stearate needed to obtain the improved pin removal properties. The upper limit defines the maximum amount of the metallic stearate tolerable before the risk, that the metallic stearate will dissolve from the separator in to the electrolyte and thereby adversely impact the electrochemical properties of the electrolyte, becomes to great. Such calcium stearates are commercially available from Witco Corporation, Greenwich, Conn. under the tradename of 'Calcium Stearate Regular.'

The present invention will be further explained with reference to the examples set forth below.

The pin removal properties were quantified using the following procedure that measures the 'pin removal force (g).'

A battery winding machine was used to wind the separator around a pin (or core or mandrel). The pin is a two (2) piece cylindrical mandrel with a 0.16 inch diameter and a smooth exterior surface. Each piece has a semicircular cross section. The separator, discussed below, is taken up on the pin. The initial force (tangential) on the separator is 0.5 kgf and thereafter the separator is wound at a rate of ten (10) inches in twenty four (24) seconds. During winding, a tension roller engages the separator being wound on the mandrel. The tension roller comprises a ⅝" diameter roller located on the side opposite the separator feed, a ¾" pneumatic cylinder to which 1 bar of air pressure is applied (when engaged), and a ¼" rod interconnecting the roller and the cylinder.

The separator consists of two (2) 30 mm (width)×10" pieces of the membrane being tested. Five (5) of these separators are tested, the results averaged, and the averaged value is reported. Each piece is spliced onto a separator feed roll on the winding machine with a 1" overlap. From the free end of the separator, i.e., distal the spliced end, ink marks are made at ½" and 7". The ½" mark is aligned with the far side of the pin (i.e., the side adjacent the tension roller), the separator is engaged between the pieces of the pin, and winding is begun with the tension roller engaged. When the 7" mark is about ½" from the jellyroll (separator wound on the pin), the separator is cut at that mark, and the free end of the separator is secured to the jellyroll with a piece of adhesive tape (1" wide, ½" overlap). The jellyroll (i.e., pin with separator wound thereon) is removed from the winding machine. An acceptable jellyroll has no wrinkles and no telescoping.

The jellyroll is placed in a tensile strength tester (i.e., Chatillon Model TCD 500-MS from Chatillon Inc., Greensboro, N.C.) with a load cell (50 lbs×0.02 lb; Chatillon DFGS 50). The strain rate is 2.5 inches per minute and data from the load cell is recorded at a rate of 100 points per second. The peak force is reported as the pin removal force.

Gurley was measured according to ASTM-D726(B). COF (Coefficient of friction) Static was measured according to JIS P 8147 entitled "Method for Determining Coefficient of Friction of Paper and Board."

EXAMPLES

In Table 1, samples C1–C2 and 1–2 are single layer polypropylene microporous membranes. C1 and C2 were commercially available membranes (prior art, PA) sold under the name CELGARD® 2400. Samples 1 and 2 illustrate the present invention. Each of these samples was extruded through a circular die at 200° C., annealed at 150° C. with 6% stretch, and stretched, i.e., cold stretch 16–18%, and hot stretch with relax to the amount shown in the table.

TABLE 1

|  | C1 (PA) | C2 (PA) | 1 | 2 |
|---|---|---|---|---|
| Resin | PP | PP | PP | PP |
| MFI | 1.2 | 1.2 | 1.2 | 1.2 |
| Total Thickness mil | 1 | 1 | 1 | 1 |
| Gurley 10 cc/sec | 24 | 24 | 24 | 24 |
| Porosity % | 40 | 40 | 40 | 40 |
| Total Stretch % | 100 | 100 | 100 | 100 |
| Calcium Stearate ppm | 340 | <1 | 250 | 1545 |
| Pin Removal Force (g) | 6500 | 7200 | 6700 | 6600 |
| Avg COF STATIC | 0.36 | 0.46 | 0.42 | 0.36 |

In Table 2, samples C3, C4, and 3 are multilayered (PP/PE/PP) microporous membranes. C3 and C4 were commercially available products, CELGARD® 2300 and CELGARD® E162, respectively. Sample 3 illustrates the present invention. All thin layer PP was extruded on a circular die at 224° C. All trilayers were annealed (125° C.) and bonded (133° C.) with 11% stretch. Then, the film was cold stretched at 20–25% and hot stretched and relaxed for the total stretch listed in Table 2.

TABLE 2

|  | C3 (PA) | C4 (PA) | 3 |
|---|---|---|---|
| Resin | PP | PP | PP |
| MFI | 1.2 | 1.2 | 1.2 |
| Total Thickness mil | 1 | 1 | 1 |
| PP layer Thickness mil | 0.36 | 0.36 | 0.36 |
| Gurley 10 cc/sec | 24 | 24 | 24 |
| Porosity % | 40 | 40 | 40 |
| Total Stretch % | 109 | 109 | 109 |
| Calcium Stearate ppm | 492 | <1 | 584 |
| Pin Removal Force (g) | 6900 | 7300 | 6100 |
| Avg COF STATIC | 0.56 | 0.58 |  |

In Table 3, samples C5, and 4 are multilayered (PP/PE/PP) microporous membranes. C5 was a commercially available product (prior art (PA)), CELGARD® 2320. Sample 4 illustrates the present invention. All thin layer PP was extruded on a circular die at 224° C. All trilayers were annealed (125° C.) and bonded (133° C.) with 11% stretch. Then, the film was cold stretched at 20–25% and hot stretched and relaxed for the total stretch listed in Table 3.

TABLE 3

|  | C5 (PA) | 4 |
|---|---|---|
| Resin | PP | PP |
| MFI | 1.2 | 1.2 |
| Total Thickness mil | 0.78 | 0.78 |
| PP layer Thickness mil | 0.24 | 0.24 |
| Gurley 10 cc/sec | 20 | 20 |
| Porosity % | 43 | 43 |
| Total Stretch % | 122 | 122 |
| Calcium Stearate ppm | <1 | 428 |
| Pin Removal Force (g) | 8300 | 6900 |
| Avg COF STATIC | 0.41 | 0.46 |

The present invention made be embodied in other forms without departing from the spirit and the central attributes thereof and, accordingly, reference should be made to the appended claims, rather than to the foregoing specification, as indicated the scope of the invention.

What is claimed is:

1. A method for removing a pin from a battery assembly comprising the step of:
   providing a battery assembly having a separator engaging a pin, said separator comprising a microporous membrane having an exterior surface portion of polypropylene, the polypropylene including at least 50 ppm of a calcium stearate; and
   removing the pin from the battery assembly.

2. The method of claim 1 wherein the calcium stearate ranges between 50 and 3000 ppm of the polypropylene.

3. The method according to claim 1 wherein the microporous membrane further comprises a plurality of micropores therethrough, said micropores having an average pore size ranging from 0.05 to 10 microns, and said membrane having a Gurley ranging from 5 to 100 seconds.

4. The method of claim 1 wherein the membrane further comprises a multilayered membrane having a polypropylene-polyethylene-polypropylene structure.

5. The method according to claim 4 being a shut-down separator.

6. The method of claim 1 wherein the polypropylene comprising a polypropylene with a melt flow index between 1 and 4.

7. The method of claim 6 wherein the polypropylene is a polypropylene with a melt flow index between 1.2 and 1.7.

8. A method for removing a pin from a battery assembly comprising the step of:

providing a battery assembly having a separator engaging a pin, said separator comprising a microporous membrane having an exterior surface portion of polypropylene, the polypropylene including at least 50 ppm of a metallic stearate, and the membrane having a thickness of $\leq 1$ mil (25 microns) and a pin removal force $\leq 7100$ g; and removing the pin from the battery assembly.

9. The method of claim 8 wherein the metallic stearate is a calcium stearate.

10. The method of claim 9 wherein the calcium stearate ranges between 50 and 3000 ppm of the polypropylene.

11. The method of claim 9 wherein the calcium stearate ranges between 300 and 600 ppm of the polypropylene.

12. The method according to claim 8 wherein the microporous membrane further comprises a plurality of micropores therethrough, said micropores having an average pore size ranging from 0.05 to 10 microns, and said membrane having a Gurley ranging from 5 to 100 seconds.

13. The method of claim 8 wherein the membrane further comprises a multilayered membrane having a polypropylene-polyethylene-polypropylene structure.

14. The method according to claim 13 being a shut-down separator.

15. The method of claim 8 wherein the polypropylene comprising a polypropylene with a melt flow index between 1 and 4.

16. The method of claims 15 wherein the polypropylene is a polypropylene with a melt flow index between 1.2 and 1.7.

17. A battery separator with improved pin removal properties comprising:

a microporous membrane having a polypropylene surface portion including at least 50 ppm of a metallic stearate.

18. The battery separator according to claim 17 wherein said metallic stearate being a calcium stearate ranging from 50 to 3000 ppm.

19. The battery separator according to claim 17 wherein said polypropylene having a melt flow index between 1 and 4.

20. The battery separator according to claim 17 having a pin removal force $\leq 7100$ g.

* * * * *